June 4, 1946.   G. MELLING, SR   2,401,577
TRACTOR OR TRACTION WHEEL
Filed Jan. 27, 1944
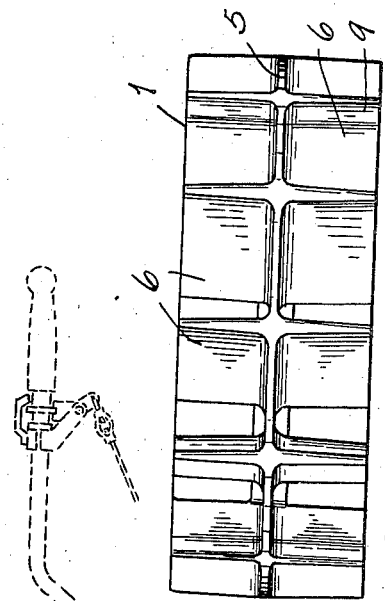
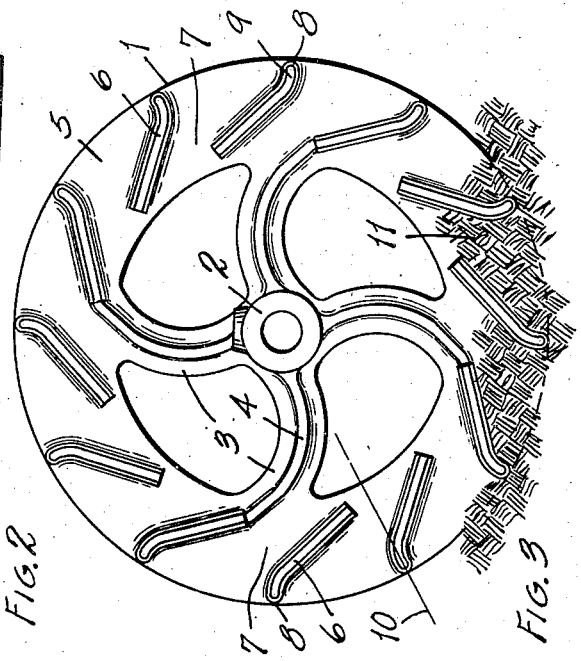
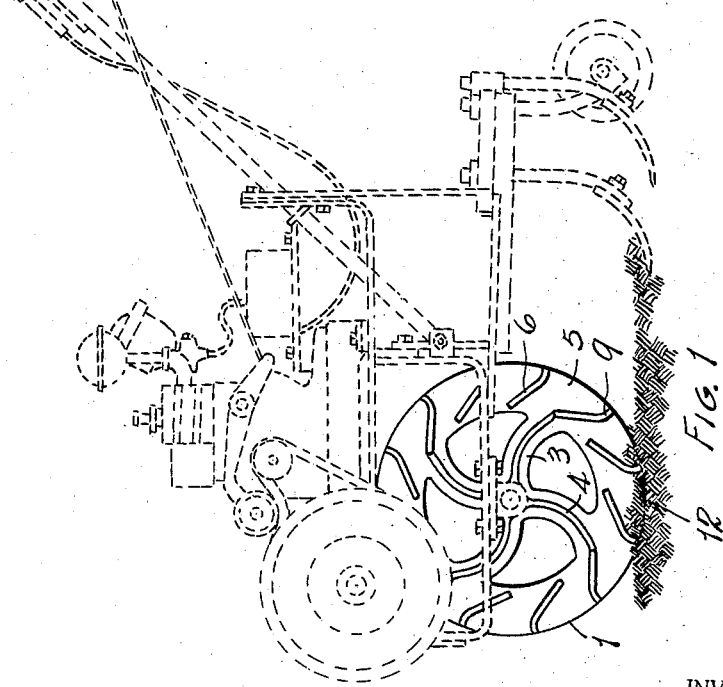
INVENTOR.
GEORGE MELLING Sr.
BY Earl D. Chappell
ATTORNEYS.

Patented June 4, 1946

2,401,577

UNITED STATES PATENT OFFICE 2,401,577

TRACTOR OR TRACTION WHEEL

George Melling, Sr., Jackson, Mich.

Application January 27, 1944, Serial No. 519,888

6 Claims. (Cl. 301—43)

This invention relates to improvements in tractor or traction wheels.

The main objects of this invention are:

First, to provide a tractor or traction wheel for agricultural implements and the like which will not clog between the tread members and which engages the earth or soil effectively to provide efficient traction in hard and soft soil conditions.

Second, to provide a tractor or traction wheel having these advantages which is relatively light in weight and at the same time strong and durable and efficient.

Third, to provide a structure of this character which not only has pulling or draft traction on both relatively hard and soft soil conditions but also which prevents side slipping or skidding in a wide range of soil and working conditions.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation of a power hand cultivator or soil working implement equipped with my improved tractor or traction wheel, certain of the treads being shown in operative relation to relatively hard soil.

Fig. 2 is a plan view of my improved tractor or traction wheel.

Fig. 3 is a side elevation, certain of the treads being shown in operative relation to relatively soft soil.

In the embodiment of my invention illustrated, 1 illustrates a soil working implement of the cultivator type such as is illustrated in my application for Letters Patent, Serial No. 452,015, filed July 23, 1942. The cultivator parts are shown in dotted lines as they form no part of this present invention. However, the tractor or traction wheel of this application is specially desirable for use in hand manipulated garden implements or machines as it is light in weight and requires less horse power because of the lighter weight and the fact that it does have a very effective ground engaging capacity both with relatively hard soils and with soft soils and different kinds of soils—for example, gravelly soils which with the types of tractor wheels with which the applicant is familiar are likely to slip and skid and even bury themselves under various conditions.

My improved tractor or traction wheel is preferably formed as an integral casting and another advantage of the structure is that the parts are so related to each other that it may be readily molded as an integral casting.

Referring to the drawing, the hub 2 is adapted to receive a suitable shaft and has spokes 3 radiating therefrom, these spokes being preferably curved and provided with reinforcing ribs 4 on each side thereof. The rim 5 extends centrally from the spokes, being formed integrally therewith, the ribs 4 extending onto the rim to reinforce the joint between the rim and the spokes. This rim is disposed radially edgewise and, as stated, centrally and is of substantial width.

The tread of the wheel comprises a plurality of plate-like tread members 6 which project laterally from the sides of the rim member 5, the same being arranged, in the embodiment illustrated, in opposed pairs. These tread members are formed integrally with the rim.

The tread members are angularly spaced around the rim to provide substantial spaces 7 between the tread members, these openings allowing soil to work up between the tread members and preventing its wedging between adjacent tread members. The tread members are of substantial width and are disposed in a rearwardly inclined relation and, in this embodiment, at an angle of approximately 45° to the radial or to radii drawn centrally therethrough.

The outer peripheral edges 8 of the tread members are substantially flush with the periphery of the rim member and are forwardly curved at 9, thus providing wheel lugs that lie in a substantially radial plane relative to the axis of the wheel, as shown by the radial line 10 of Fig. 3. Relatively soft soil is indicated at 11 in Fig. 3 and relatively hard soil at 12 in Fig. 1. These lug portions are effective in gripping or engaging the relatively hard soil as is illustrated in Fig. 1.

The tread members 6 are at such an angle that their sides are presented to the soil in a substantially flatwise position as is illustrated in Fig. 3 where one tread member is just entering the soil, another within the soil, and a third leaving the soil. Of course, it will be understood that this illustration is merely intended to illustrate the relationship of the tread members to the soil where the soil is relatively soft and varying conditions would present different degrees of immersion or soil engagement but the coacting relationship is the same. The central rim is also embedded in the soil and engages the soil to prevent lateral movement which is of great advantage in the steering of the implement and in minimizing labor of the operator.

The lug portions are effective where the soil is hard or firm so that the wheel does not settle very deeply therein. Further, in cases where a stone is slightly projecting and the tread member might slip over it, the hook-like effect of the lugs takes an effective hold. The action of the tread members may be likened to that of a horse's hoof, particularly one pulling a load. Substantially the entire load is carried by the tread members and they are self-clearing, being positioned so that as they enter the soil there is an upward pushing sliding action against the under side of the tread members, effectively acting to clear them of any soil that may be adhering at the time the tread members leave the soil.

Machines equipped with my improved tractor or traction wheel may be easily manipulated on either side inasmuch as the central rim prevents side slipping and this is also highly important in the steering of the implement and to resist slurring or twisting movement which is likely to arise from different soil conditions or ground working tools. It is obvious that this is a desirable feature in cultivating crops where it is desirable to work as close to the row as is possible without danger of uprooting or throwing soil upon the plants being cultivated.

I have illustrated and described my invention in a very practical embodiment thereof. While this is designed and proposed for use on argricultural implements such, for example, as described, the tractor wheel has advantages for use in larger tools and in other relations where effective traction is desired under widely varying soil conditions.

Having thus described my invention, what I claim as new and desire to secure by Letters Patent is:

1. A metal traction wheel for agricultural implements and the like comprising a hub and spokes radiating therefrom, a central annular rim member of substantial radial width integral with said hub and spokes and disposed radially edgewise on the outer ends of the spokes, and a plurality of plate-like tread members integral with said rim member and projecting laterally from the sides thereof in oppositely disposed pairs, the tread members of each pair being disposed in alinement transversely of said rim member, the pairs being angularly spaced around said rim member, said tread members being of substantial width and disposed to extend outwardly in a direction inclined rearwardly relative to the direction of rotation of the wheel and in such spaced relation as to provide substantial clearance openings between adjacent tread members, the outer peripheral edges of the tread members being substantially flush with the periphery of the rim member and the peripheral edge portions being curved outwardly and forwardly relative to the direction of rotation of the wheel to provide engaging lugs, the sides of the tread members inwardly from said lugs being presented to relatively soft soil substantially flatwise as the wheel rotates to prevent excessive sinking of the wheel into such soil, the outwardly and forwardly curved lugs at the outer ends of the tread members permitting the wheel to effectively engage relatively hard soils.

2. A metal traction wheel for agricultural implements and the like comprising a hub and spokes radiating therefrom and disposed in a plane at right angles to the axis of rotation of the wheel, a central annular rim member of substantial radial width integral with said hub and spokes and disposed radially edgewise on the outer ends of the spokes and in said plane of the spokes, and a plurality of plate-like tread members integral with said rim member and projecting laterally from the sides thereof in oppositely disposed pairs, the tread members of each pair being disposed in alinement transversely of said rim member, the pairs being angularly spaced around said rim member, said tread members being of substantial width and disposed in a rearwardly inclined relation and in such spaced relation as to provide substantial clearance openings between adjacent tread members, the sides of the tread members being presented to the soil substantially flatwise as the wheel rotates.

3. A metal traction wheel for agricultural implements and the like comprising a hub and spokes radiating therefrom, a central annular rim member of substantial radial width integral with said hub and spokes and disposed radially edgewise on the outer ends of the spokes, and a plurality of plate-like tread members integral with said rim member and projecting laterally from the sides thereof in oppositely disposed pairs, the tread members of each pair being disposed in alinement transversely of said rim member, the pairs being angularly spaced around said rim member, said tread members being of substantial width and disposed to extend outwardly and in a rearwardly inclined relation at an angle of approximately 45° to the radii of the wheel and in such spaced relation as to provide substantial clearance openings between adjacent tread members, the sides of the tread members being presented to relatively soft soil substantially flatwise as the wheel rotates to prevent the wheel unduly sinking into such soil, said tread members having the outer ends thereof disposed substantially parallel to the radii of the wheel to permit the wheel to effectively engage relatively hard soils.

4. A metal traction wheel for agricultural implements and the like comprising a hub and spokes radiating therefrom, a central annular rim member of substantial radial width integral with said hub and spokes and disposed radially edgewise on the outer ends of the spokes, and a plurality of plate-like tread members integral with said rim member and projecting laterally from the sides thereof uniformly angularly spaced around said rim member to provide substantial clearance openings between adjacent tread members, said tread members being of substantial width and disposed to extend outwardly in a direction inclined rearwardly relative to the direction of rotation of the wheel, the outer peripheral edge portions of the tread members being curved outwardly and forwardly relative to the direction of rotation of the wheel to provide soil engaging lugs to permit the wheel so effectively engage relatively hard soils.

5. A traction wheel for agricultural implements and the like comprising a hub, spokes, a central annular rim disposed radially edgewise, and a plurality of plate-like tread members projecting laterally from the sides of said rim member in angularly spaced relation to provide substantial openings between adjacent tread members, said tread members being of substantial length and width and disposed to extend outwardly in a direction inclined rearwardly relative to the direction of rotation of the wheel whereby they engage relatively loose soil substantially flatwise as the wheel rotates, the outer side edges of the tread members being curved outwardly and forwardly to provide soil engaging lugs.

6. A metal traction wheel for agricultural implements and the like comprising a hub, spokes, a central annular rim of substantial width disposed radially edgewise, and a plurality of plate-like tread members projecting laterally from the sides of said rim member in angularly spaced relation to provide substantial openings between adjacent tread members, said tread members being disposed to extend outwardly in a direction inclined rearwardly relative to the direction of rotation of the wheel and so that they provide substantially flat but somewhat inclined soil engaging surfaces to the soil as the wheel rotates, the outer side edges of the tread members being forwardly curved to provide soil engaging lugs.

GEORGE MELLING, Sr.